United States Patent
Li et al.

(10) Patent No.: US 12,431,056 B2
(45) Date of Patent: Sep. 30, 2025

(54) DISPLAY DEVICE AND ELECTRONIC EQUIPMENT

(71) Applicant: WUHAN CHINA STAR OPTOELECTRONICS SEMICONDUCTOR DISPLAY TECHNOLOGY CO., LTD., Wuhan (CN)

(72) Inventors: Jihui Li, Wuhan (CN); Yuan Wu, Wuhan (CN); Rui Ju, Wuhan (CN)

(*) Notice: Subject to any disclaimer, the term of this patent is extended or adjusted under 35 U.S.C. 154(b) by 0 days.

(21) Appl. No.: 17/908,237

(22) PCT Filed: Jun. 29, 2022

(86) PCT No.: PCT/CN2022/102491
§ 371 (c)(1),
(2) Date: Aug. 31, 2022

(87) PCT Pub. No.: WO2023/240699
PCT Pub. Date: Dec. 21, 2023

(65) Prior Publication Data
US 2024/0221585 A1  Jul. 4, 2024

(30) Foreign Application Priority Data
Jun. 15, 2022 (CN) .......................... 202210679739.4

(51) Int. Cl.
G09G 3/20 (2006.01)
(52) U.S. Cl.
CPC ... G09G 3/2092 (2013.01); G09G 2300/0842 (2013.01); G09G 2330/021 (2013.01); G09G 2350/00 (2013.01)

(58) Field of Classification Search
CPC ................. G09G 2300/0842; G09G 2320/103
See application file for complete search history.

(56) References Cited

U.S. PATENT DOCUMENTS 6,332,002 B1* 12/2001 Lim ..................... H04N 19/523
   375/E7.113
8,842,140 B2* 9/2014 Oniki ..................... G09G 3/342
   345/690

(Continued)

FOREIGN PATENT DOCUMENTS

CN  108320723 A  7/2018
CN  111064863 A  4/2020
(Continued)

OTHER PUBLICATIONS

International Search Report in International application No. PCT/CN2022/102491, mailed on Dec. 16, 2022.

(Continued)

Primary Examiner — William Boddie
Assistant Examiner — Bipin Gyawali

(57) ABSTRACT

The present application provides a display device and an electronic equipment, the display device includes an application processor, a display driving chip, and a display panel. The display device not only reduces numbers of display data frames that the application processor needs to transmit to the display driving chip but also improves a continuity of picture display of the display panel with a lower bandwidth between the application processor and the display driving chip by additionally generating at least one derived picture data frame between two adjacent native picture data frames.

16 Claims, 7 Drawing Sheets

(56) References Cited

U.S. PATENT DOCUMENTS

| | | | |
|---|---|---|---|
| 12,255,655 B2* | 3/2025 | Fiedler | G01R 31/088 |
| 2002/0015104 A1* | 2/2002 | Itoh | G09G 3/20 |
| | | | 348/E7.003 |
| 2004/0090404 A1* | 5/2004 | Endo | G09G 3/3275 |
| | | | 345/82 |
| 2008/0036749 A1* | 2/2008 | Moriyama | G06F 3/0412 |
| | | | 345/204 |
| 2008/0226197 A1 | 9/2008 | Saga | |
| 2009/0184952 A1* | 7/2009 | Yoshihama | G09G 3/2927 |
| | | | 345/212 |
| 2018/0130418 A1* | 5/2018 | Zhu | H01L 29/78648 |
| 2020/0168183 A1* | 5/2020 | Kim | G09G 5/003 |
| 2021/0092340 A1 | 3/2021 | Kang | |
| 2022/0028319 A1* | 1/2022 | Kim | G09G 3/3233 |

FOREIGN PATENT DOCUMENTS

| | | |
|---|---|---|
| CN | 111586409 A | 8/2020 |
| CN | 113225619 A | 8/2021 |
| CN | 114079824 A | 2/2022 |
| CN | 114302092 A | 4/2022 |

OTHER PUBLICATIONS

Written Opinion of the International Search Authority in International application No. PCT/CN2022/102491, mailed on Dec. 16, 2022.

Chinese Office Action issued in corresponding Chinese Patent Application No. 202210679739.4 dated Dec. 6, 2024, pp. 1-10.

* cited by examiner

DISPLAY DEVICE AND ELECTRONIC EQUIPMENT

FIELD OF INVENTION

The present application relates to a field of display technology, and especially to a display device and an electronic equipment.

BACKGROUND OF INVENTION

Currently, a refresh frequency of a display panel is same as a driving frequency of an application processor. If the display panel needs to display video pictures at 120 Hz, the application processor also needs to transmit data at 120 Hz. However, as resolution of the display panel becomes higher and higher, more and more video data need to be transmitted, and a bandwidth requirement of the application processor becomes more and more demanding. If the display panel needs to continuously display at 120 Hz, the bandwidth of the application processor to transmit data needs to reach 8.96 Gb/s, which will undoubtedly increase cost and power consumption of the application processor.

SUMMARY OF INVENTION

The present application provides a display device and an electronic equipment to alleviate a technical problem of a high transmission bandwidth between an application processor and a display driving chip.

In a first aspect, the present application provides a display device, the display device includes an application processor, a display driving chip, and a display panel, and the application processor is used to output at least two display data frames. An input end of the display driving chip is connected to an output end of the application processor, for outputting at least two native picture data frames corresponding to the at least two display data frames and at least one derived picture data frame between two adjacent native picture data frames. The display panel is connected to an output end of the display driving chip for displaying pictures according to each of the native picture data frames and each of the derived picture data frames.

In some embodiments, the display driving chip includes a first memory, a second memory, a comparator, and a display driver, the first memory is connected to the application processor for storing an $N^{th}$ display data frame of the at least two display data frames; the second memory is connected to the application processor for storing an $(N+1)^{th}$ display data frame of the at least two display data frames; the comparator is connected to the first memory and the second memory for comparing a picture difference degree between the $N^{th}$ display data frame and the $(N+1)^{th}$ display data frame and outputting a comparison result of the picture difference degree and a preset threshold; the display driver is connected to the first memory, the second memory, and the comparator for sequentially outputting an $N^{th}$ native picture data frame corresponding to the $N^{th}$ display data frame, at least one derived picture data frame between the $N^{th}$ native picture data frame and an $(N+1)^{th}$ native picture data frame, and the $(N+1)^{th}$ native picture data frame corresponding to the $(N+1)^{th}$ display data frame according to the comparison result.

In some embodiments, a first input end of the comparator is connected to an output end of the first memory, a second input end of the comparator is connected to an output end of the second memory, and an output end of the comparator is connected to an input end of the display driver.

In some embodiments, the comparator includes a first comparison unit and a second comparison unit, a first input end of the first comparison unit is connected to the first memory, and a second input end of the first comparison unit is connected to the second memory; a first input end of the second comparison unit is connected to an output end of the first comparison unit, a second input end of the second comparison unit is connected to a reference end corresponding to the preset threshold, and an output end of the second comparison unit is connected to an input end of the display driver.

In some embodiments, in response to the picture difference degree being less than or equal to the preset threshold and the picture difference degree being greater than zero, the display driver sequentially outputs the $N^{th}$ native picture data frame, the at least one derived picture data frame and the $(N+1)^{th}$ native picture data frame, and a picture to be displayed corresponding to the at least one derived picture data frame is different from a picture to be displayed corresponding to the $N^{th}$ native picture data frame and a picture to be displayed corresponding to the $(N+1)^{th}$ native picture data frame.

In some embodiments, in response to the picture difference degree being greater than the preset threshold or the picture difference degree being equal to zero, the display driver sequentially outputs the $N^{th}$ native picture data frame, the at least one derived picture data frame and the $(N+1)^{th}$ native picture data frame, and a picture to be displayed corresponding to the at least one derived picture data frame is same as at least one of a picture to be displayed corresponding to the $N^{th}$ native picture data frame and a picture to be displayed corresponding to the $(N+1)^{th}$ native picture data frame.

In some embodiments, a picture to be displayed corresponding to a former part of a frame in the at least one derived picture data frame is same as the picture to be displayed corresponding to the $N^{th}$ native picture data frame, and a picture to be displayed corresponding to a later part of the frame in the at least one derived picture data frame is same as the picture to be displayed corresponding to the $(N+1)^{th}$ native picture data frame.

In some embodiments, a range of the preset threshold is greater than zero and less than or equal to 40%.

In some embodiments, a data transmission frame rate between the application processor and the display driving chip is set to K Hz, a refresh frequency of the display panel is J Hz, and a result of dividing J by K is L; and the at least one derived picture data frame is [L−1] derived picture data frames, wherein [L−1] is value after L−1 is rounded.

In some embodiments, the data transmission frame rate is less than the refresh frequency.

In a second aspect, the present application provides an electronic equipment, which includes the display device in at least one of the above embodiments, wherein the application processor communicates serially with the display driving chip.

The display device and the electronic equipment provided by the present application not only reduce numbers of the display data frames that the application processor needs to transmit to the display driving chip but also improve a continuity of the picture display of the display panel with a lower bandwidth between the application processor and the display driving chip by additionally generating the at least one derived picture data frame between the two adjacent native picture data frames in the display driving chip.

In addition, compared with the prior art in which a refresh frequency of a display panel and a driving frequency of an application processor need to be same, the display device and the electronic equipment provided by the present application can additionally generate the at least one derived picture data frame between the two adjacent native picture data frames, thereby reducing amount of video data transmission between the application processor and the display driving chip. Therefore, the application processor can ensure a normal requirement of the terminal display at the driving frequency lower than the refresh frequency of the display panel.

Furthermore, since configuration of the application processor in terms of the bandwidth and the driving frequency is reduced, this can not only reduce cost of the application processor, but also reduce power consumption of the application processor, thereby reducing the cost and the power consumption of the display device and electronic equipment.

DETAILED DESCRIPTION OF PREFERRED EMBODIMENTS

In order to make the objections, technical solutions, and effects of the present application clearer and clearer, the present application will be further described in detail below with reference to the accompanying drawings and examples. It should be understood that the specific embodiments described herein are only used to explain the present application, but not to limit the present application.

Figure 1:
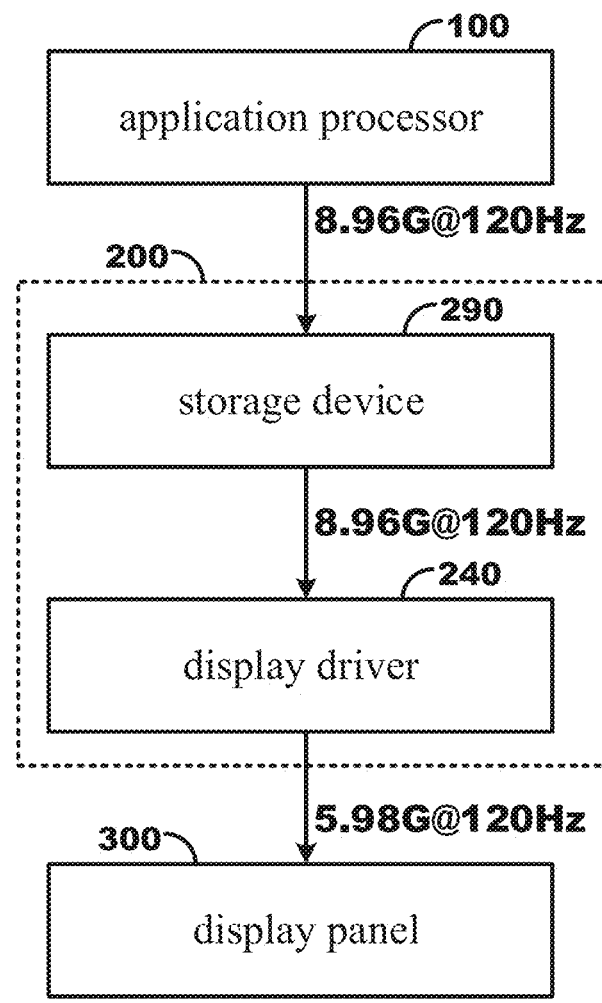
FIG. 1 is a schematic structural diagram of a display device in a related art.

FIG. 1 is a schematic structural diagram of a display device in a related art. The display device includes an application processor 100, a storage device 290, a display driver 240, and a display panel 300 connected in sequence. A refresh frequency of the display panel 300 is 120 Hz as an example. Since a driving frequency of the application processor 100 and a transmission frame rate of the display panel 300 need to be same, a data transmission frequency from the application processor 100 to the display panel 300 is also 120 Hz. Correspondingly, a transmission bandwidth from the application processor 100 to the display driver 240 needs to be not less than 8.96 Gb/s, and a transmission bandwidth between the display driver 240 and the display panel 300 needs to be no less than 5.98 Gb/s, so as to meet the display panel 300 to display at the refresh frequency of 120 Hz.

However, such a driving architecture may cause an excessively high transmission bandwidth between the application processor 100 and a display driving chip 200 thereby increasing cost and power consumption of the application processor 100.

Figure 2:
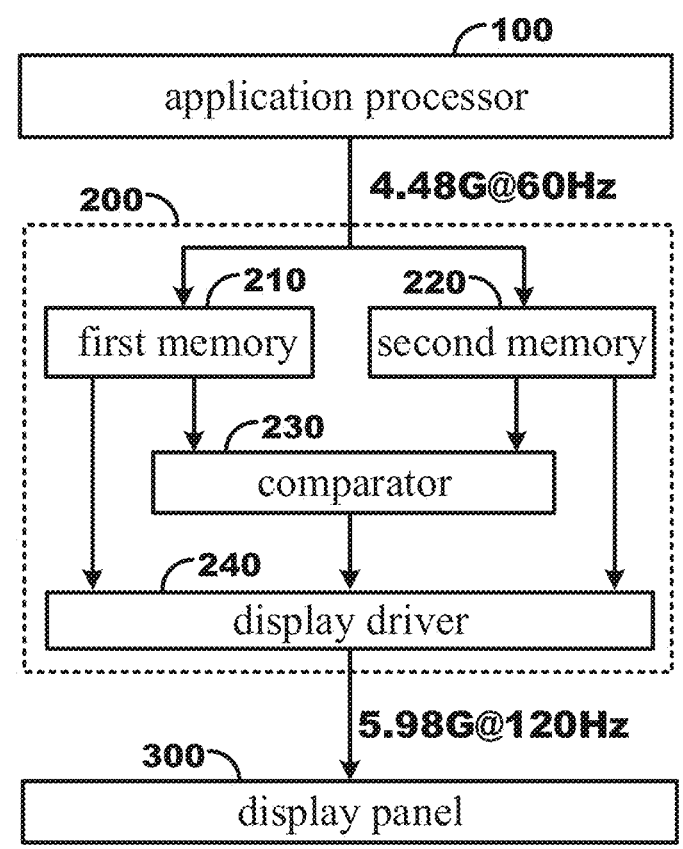
FIG. 2 is a first schematic structure diagram of a display device provided by an embodiment of the present application.

In view of the above-mentioned technical problem that the transmission bandwidth between the application processor 100 and the display driving chip 200 is too high, the present embodiment provides a display device. Please refer to FIG. 2 to FIG. 6, as shown in FIG. 2, the display device includes an application processor 100, a display driving chip 200, and a display panel 300. The application processor 100 is used to output at least two display data frames. An input end of the display driving chip 200 is connected to an output end of the application processor 100 for outputting at least two native picture data frames corresponding to the at least two display data frames and at least one derived picture data frame between two adjacent native picture data frames. The display panel 300 is connected to an output end of the display driving chip 200 for displaying pictures according to each of the native picture data frames and each of the derived picture data frames.

After an improvement of the present embodiment, when the refresh frequency of the display panel 300 is 120 Hz, the driving frequency of the application processor 100 only needs to be 60 Hz to meet the transmission requirement. Compared with the related art shown in FIG. 1, when the transmission bandwidth from the display driving chip 200 to the display panel 300 is kept at 5.98 Gb/S, the transmission bandwidth from the application processor 100 to the display driving chip 200 can be reduced to 4.48 Gb/S. It can be seen after the improvement, the refresh frequency and the transmission bandwidth of the display panel 300 are significantly reduced.

It can be understood that, in the display device provided by the present embodiment, by additionally generating at least one derived picture data frame between two adjacent native picture data frames in the display driving chip 200, it not only reduces numbers of display data frames that the application processor 100 needs to transmit to the display driving chip 200, but also can improve continuity of picture display of the display panel 300 with a lower bandwidth between the application processor 100 and the display driving chip 200.

In addition, compared with the prior art in which the refresh frequency of the display panel 300 and the driving frequency of the application processor 100 need to be same, since the display device provided in the present embodiment can additionally generate the at least one derived picture data frame between the two adjacent native picture data frames, transmission amount of video data between the application processor 100 and the display driving chip 200 is reduced. Therefore, the application processor 100 can ensure a normal requirement of a terminal display at a driving frequency lower than the refresh frequency of the display panel 300.

Furthermore, due to a decrease in configuration of the application processor 100 in terms of bandwidth and driving frequency, etc., this not only can reduce the cost of the application processor 100, but also reduce the power consumption of the application processor 100, thereby reducing cost and power consumption of the display device and electronic equipment.

It should be noted that each derived picture data frame may be any native picture data frame adjacent to it in output timing. Alternatively, each derived picture data frame may also be generated by using motion estimation and motion compensation (MEMC) technology on a basis of two adjacent display data frames/native picture data frames to form continuity in the picture display of the display panel 300.

Wherein display images corresponding to each display data frame and native image data frame corresponding to the display data frame are same. It is only that both data forms displayed in different transmission processes are different.

In an embodiment, as shown in FIG. 2, the display driving chip 200 includes a first memory 210, a second memory 220, a comparator 230, and a display driver 240. The first memory 210 is connected to the application processor 100 for storing an $N^{th}$ display data frame of the at least two display data frames. The second memory 220 is connected to the application processor 100 for storing an $(N+1)^{th}$ display data frame in the at least two display data frames. The comparator 230 is connected to the first memory 210 and the second memory 220 for comparing a picture difference degree between the Nth display data frame and the $(N+1)^{th}$ display data frame, and outputting a comparison result of the picture difference degree and a preset threshold. The display driver 240 is connected to the first memory 210, the second memory 220, and the comparator 230 for sequentially outputting the Nth original picture data frame corresponding to the Nth display data frame, the Nth original picture data frame, at least one derived picture data frame between an $(N+1)^{th}$ native picture data frame and the $(N+1)^{th}$ native picture data frame corresponding to the $(N+1)^{th}$ display data frame based on the comparison result.

It should be noted that, when the display driver 240 receives the corresponding display data frame, it can also receive the corresponding display data frame from input ends of the first memory 210 and the second memory 220, that is, the output end of the application processor 100, instead of going through cache of the first memory 210 and the second memory 220. In this way, buffering time can be reduced, thereby increasing an arrival time of the corresponding display data frame to the display driver 240, so as to provide preparation time for subsequent processing of a derived picture data frame.

Wherein the preset threshold can be set according to needs of picture display. For example, a range of the preset threshold can be greater than zero and less than or equal to 40%, specifically 10%, 20%, or 30%, and so on.

In some embodiments, a first input end of the comparator 230 is connected to an output end of the first memory 210, a second input end of the comparator 230 is connected to an output end of the second memory 220, and an output end of the comparator 230 is connected to an input end of the display driver 240.

It can be understood that buffering of the display data frames in the first memory 210 and the second memory 220 can enable different display data frames to arrive at the comparator 230 simultaneously or synchronously for comparison.

Figure 3:
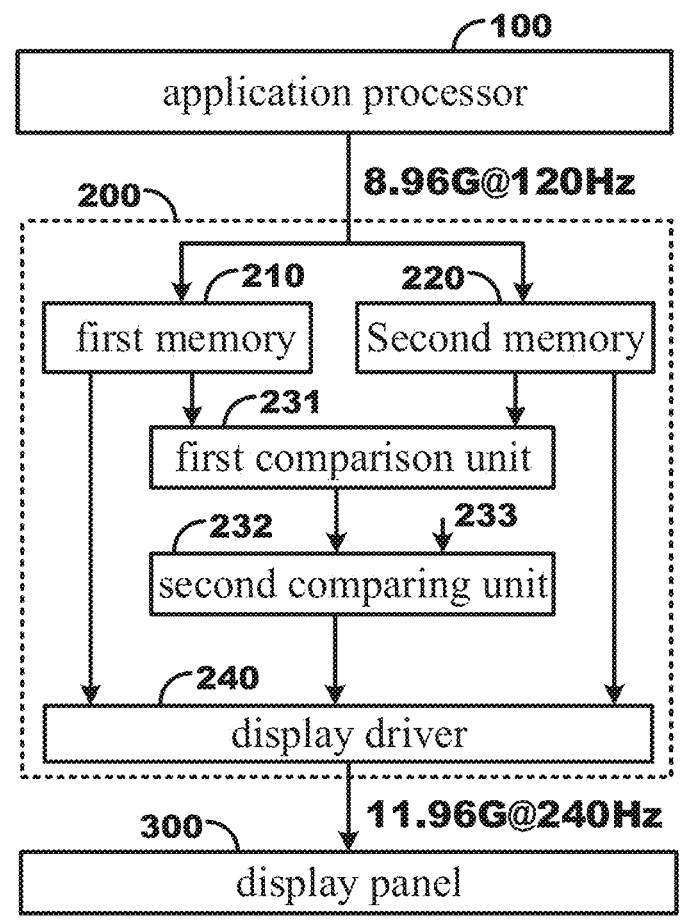
FIG. 3 is a second schematic structure diagram of the display device provided by the embodiment of the present application.

In an embodiment, as shown in FIG. 3, the comparator 230 includes a first comparison unit 231 and a second comparison unit 232. A first input end of the first comparison unit 231 is connected to the first memory 210, and a second input end of the first comparison unit 231 is connected to the second memory 220; a first input end of the second comparison unit 232 is connected to an output end of the first comparison unit 231, a second input end of the second comparison unit 232 is connected to a reference end 233 corresponding to the preset threshold, and an output end of the second comparison unit 232 is connected to an input end of the display driver 240.

It should be noted that the reference end 233 in the present embodiment may be connected to corresponding electrical parameters such as voltage and current as required, so as to form a corresponding relationship with the above-mentioned preset threshold.

It can be understood that the first comparison unit 231 is used to compare the Nth display data frame and the $(N+1)^{th}$ display data frame to obtain the picture difference degree. The second comparing unit 232 is used to compare the picture difference degree and the preset threshold to obtain a comparison result.

In some embodiments, in response to the picture difference degree being less than or equal to the preset threshold and the picture difference degree being greater than zero, the display driver 240 sequentially outputs an $N^{th}$ native picture data frame, the at least one derived picture data frame, and the $(N+1)^{th}$ native picture data frame, a picture to be displayed corresponding to the at least one derived picture data frame is different from a picture to be displayed corresponding to the Nth native picture data frame and a picture to be displayed corresponding to the $(N+1)^{th}$ native picture data frame.

It should be noted that, when the display driver 240 sequentially outputs the Nth native picture data frame, at least one derived picture data frame, and the $(N+1)^{th}$ native picture data frame, correspondingly, the display panel 300 sequentially displays the picture to be displayed corresponding to the Nth native picture data frame, the picture to be displayed corresponding to the at least one derived picture data frame, and the picture to be displayed corresponding to the $(N+1)^{th}$ native picture data frame. Wherein, in the present embodiment, the picture to be displayed corresponding to the Nth native picture data frame, the picture to be displayed corresponding to the at least one derived picture data frame, and the picture to be displayed corresponding to the $(N+1)^{th}$ native picture data frame may constitute a continuous action change as a whole.

In an embodiment, in response to the picture difference degree being greater than the preset threshold or the picture difference degree being equal to zero, the display driver 240 sequentially outputs the Nth native picture data frame, the at least one derived picture data frame, and the $(N+1)^{th}$ native picture data frame, the picture to be displayed corresponding to the at least one derived picture data frame is same as at least one of the picture to be displayed corresponding to the Nth native picture data frame and the picture to be displayed corresponding to the $(N+1)^{th}$ native picture data frame.

It should be noted that, in the present embodiment, if a difference between the pictures corresponding to the Nth native picture data frame and the $(N+1)^{th}$ native picture data frame is too large, it will reduce overall relevance of an action of an intermediate frame picture synthesized based on the two, thereby affecting a viewing effect. Therefore, when the picture difference degree is greater than the preset threshold, it indicates that the difference between a former frame and a later frame is relatively large. At this time, if picture synthesis is still performed, data of the intermediate frame may be inaccurate and cause an abnormal picture. In order to avoid this phenomenon, at this time, the Nth native picture data frame or the $(N+1)^{th}$ native picture data frame can be repeatedly output at a certain frequency or a higher frequency, which can also improve continuity of the picture.

When the picture difference degree is equal to zero, that is, the Nth native picture data frame and the $(N+1)^{th}$ native picture data frame are completely same, it indicates that the picture is still at this time. In this situation, it is not necessary to obtain the corresponding derived picture data frame through a picture synthesis method. It is only necessary to refresh and output the corresponding Nth native picture data frame and the $(N+1)^{th}$ native picture data frame to improve the continuity of the picture display.

In an embodiment, a picture to be displayed corresponding to a former part of the frame in the at least one derived picture data frame is same as the picture to be displayed corresponding to the Nth native picture data frame, and a picture to be displayed corresponding to a later part of the frame in the at least one derived picture data frame is same as the picture to be displayed corresponding to the $(N+1)^{th}$ native picture data frame.

It should be noted that, in the present embodiment, when the picture difference degree is greater than the preset threshold or the picture difference degree is equal to zero, if there are multiple, such as two, derived picture data frames, the former derived picture data frame may be the Nth native picture data frame, and the latter derived picture data frame may be the $(N+1)^{th}$ native picture data frame; if there are three, a middle derived picture data frame may be the Nth native picture data frame or the $(N+1)^{th}$ native picture data frame, and so on. It can be understood that this can also improve the continuity of the picture.

In an embodiment, a data transmission frame rate between the application processor 100 and the display driving chip 200 is set to K Hz, a refresh frequency of the display panel is J Hz, and a result of dividing J by K is L; the at least one derived picture data frame is [L-1] derived picture data frames, wherein [L-1] is a value after L-1 is rounded.

It should be noted that the present embodiment provides specific numbers of the derived picture data frames located between two adjacent native picture data frames. The specific numbers can satisfy a driving frequency of the application processing or when the above-mentioned data transmission frame rate is inconsistent with the refresh frequency, the continuity of the picture display can still be improved.

Wherein a specific rounding algorithm for [L-1] can be rounded, rounded up to a nearest integer, or rounded down to the nearest integer and so on.

In an embodiment, the data transmission frame rate is less than the refresh frequency. It should be noted that, compared with the prior art in which the refresh frequency of the display panel 300 and the driving frequency of the application processor 100 need to be same. Since the electronic equipment provided in the present embodiment can additionally generate at least one derived picture data frame between the two adjacent native picture data frames, the transmission amount of video data between the application processor 100 and the display driving chip 200 is reduced. Therefore, the application processor 100 can meet the normal requirements of the terminal display at a driving frequency lower than the refresh frequency of the display panel 300.

Figure 4:
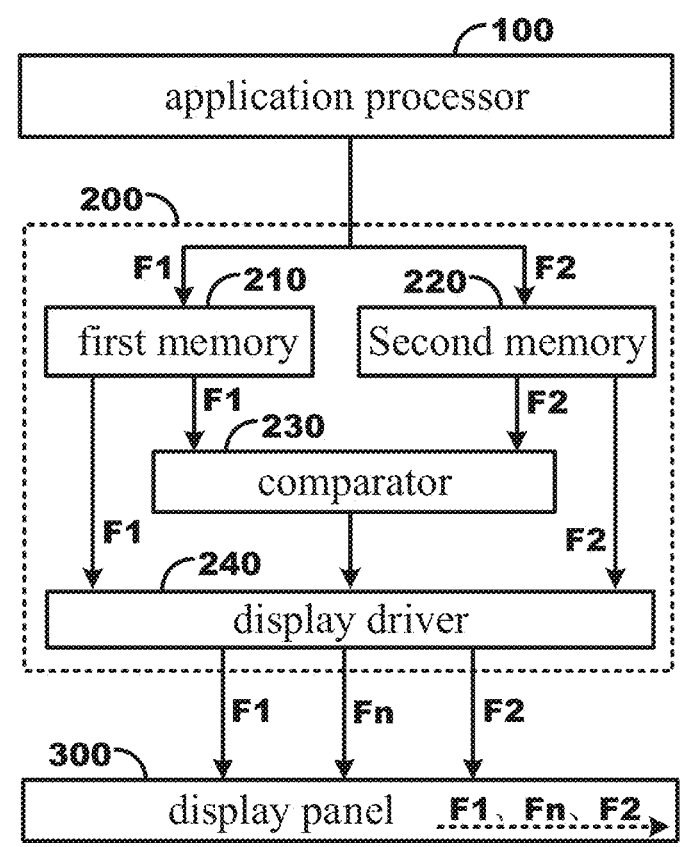
FIG. 4 is a first schematic frame-flow diagram of the display device according to the embodiment of the present application.

FIG. 4 is a first schematic frame-flow diagram of the display device according to an embodiment of the present application. When the driving frequency of the application processor 100 is 60 Hz, and the display panel 300 performs picture display at the refresh frequency of 120 Hz, as shown in FIG. 4, the application processor 100 is used to transmit a display picture, and data of the display picture may be picture (RGB) data or subscription profile repository (SPR) data. Wherein the application processor 100 may include a sending interface, the display driving chip 200 may further include a receiving interface, and the sending interface and the receiving interface are matched with each other and may be used for transmission of display pictures. Wherein the data of the displayed picture may include a first frame data stream F1 (Nth display data frame/Nth native picture data frame), a second frame data stream F2 ($(N+1)^{th}$ display data frame/$(N+1)^{th}$ native picture data frame). The first frame data stream F1 and the second frame data stream F2 serially outputting from the application processor 100 arrive at the first memory 210 and the second memory 220 in sequence, and can be synchronously output to the comparator 230 and the display driver 240, after corresponding processing by the display driver 240, the first frame data stream F1, a derived frame data stream Fn corresponding to the derived picture data frame, and the second frame data stream F2 are sequentially output to the display panel 300. The display panel 300 sequentially displays the picture to be displayed corresponding to the first frame data stream F1, the picture to be displayed corresponding to the derived frame data stream Fn, and the picture to be displayed corresponding to the second frame data stream F2.

Figure 5:
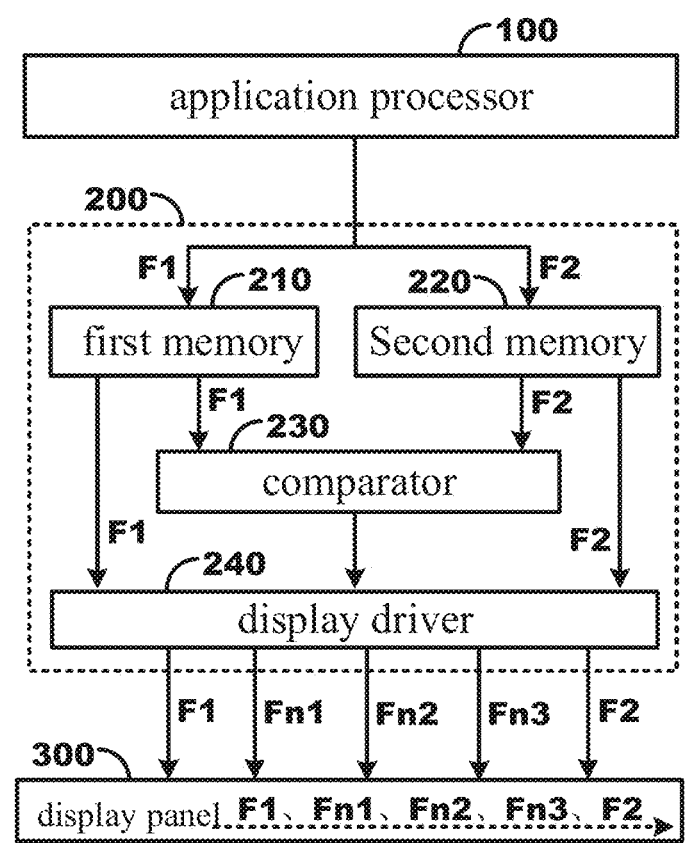
FIG. 5 is a second schematic frame-flow diagram of the display device according to the embodiment of the present application.

FIG. 5 is a second schematic frame-flow diagram of the display device according to an embodiment of the present application. When the driving frequency of the application processor 100 is 30 Hz and the display panel 300 performs picture display at the refresh frequency of 120 Hz. As shown in FIG. 5, compared with FIG. 4, at this time, it is necessary to insert three derived frame data streams, namely a derived frame data stream Fn1, a derived frame data stream Fn2, and a derived frame data stream Fn3, between the first frame data stream F1 and the second frame data stream F2. Then, the display panel 300 sequentially displays a picture to be displayed corresponding to the first frame data stream F1, a picture to be displayed corresponding to the derived frame data stream Fn1, a picture to be displayed corresponding to the derived frame data stream Fn2, a picture to be displayed corresponding to the derived frame data stream Fn3, and a picture to be displayed corresponding to the second frame data stream F2.

Figure 6:
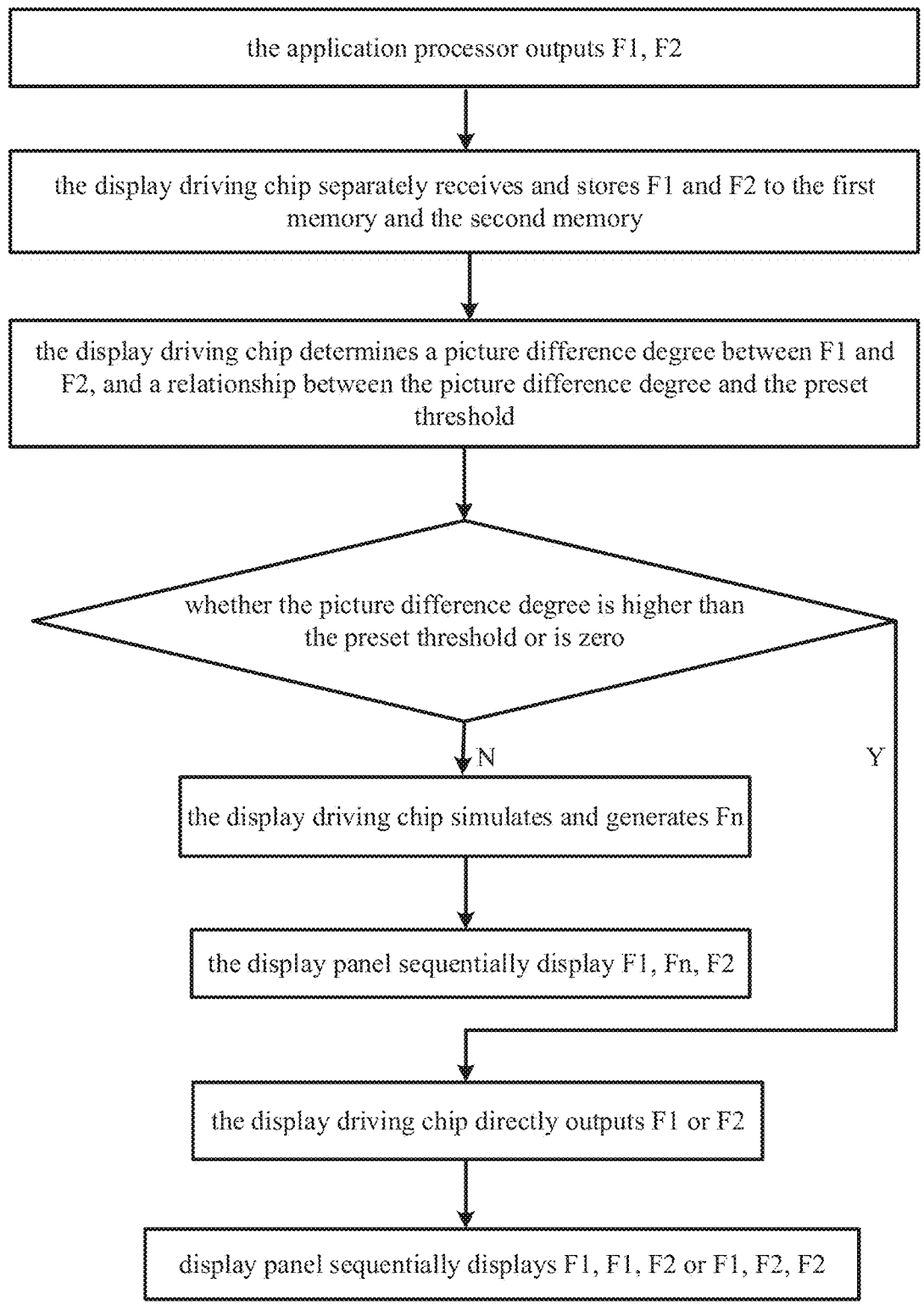
FIG. 6 is a schematic workflow diagram of the display device provided by the embodiment of the present application.

In summary, the display process corresponding to the above display device is specifically shown in FIG. 6, the application processor 100 outputs the first frame data stream F1 and the second frame data stream F2, and the display driving chip 200 separately receives and stores the first frame data stream F1 and the second frame data stream F2 to the first memory 210 and the second memory 220. The display driving chip 200 determines a picture difference degree between the first frame data stream F1 and the second frame data stream F2, and a relationship between the picture difference degree and the preset threshold. Then it is determines whether the picture difference degree is higher than the preset threshold or is zero. If not, the display driving chip 200 simulates and generates the derived frame data stream Fn, and then the display panel 300 sequentially displays the picture to be displayed corresponding to the first frame data stream F1, the picture to be displayed corresponding to the derived frame data stream Fn, and the picture to be displayed corresponding to the second frame data stream F2. If yes, the display driving chip 200 directly outputs the first frame data stream F1 or the second frame data stream F2, and then the display panel 300 sequentially displays the picture to be displayed corresponding to the first frame data stream F1, the picture to be displayed corresponding to the first frame data stream F1, and the picture to be displayed corresponding to the second frame data stream F2, or sequentially displays the picture to be displayed corresponding to the first frame data stream F1, the picture to be displayed corresponding to the second frame data stream F2, and the picture to be displayed corresponding to the second frame data stream F2.

Figure 7:
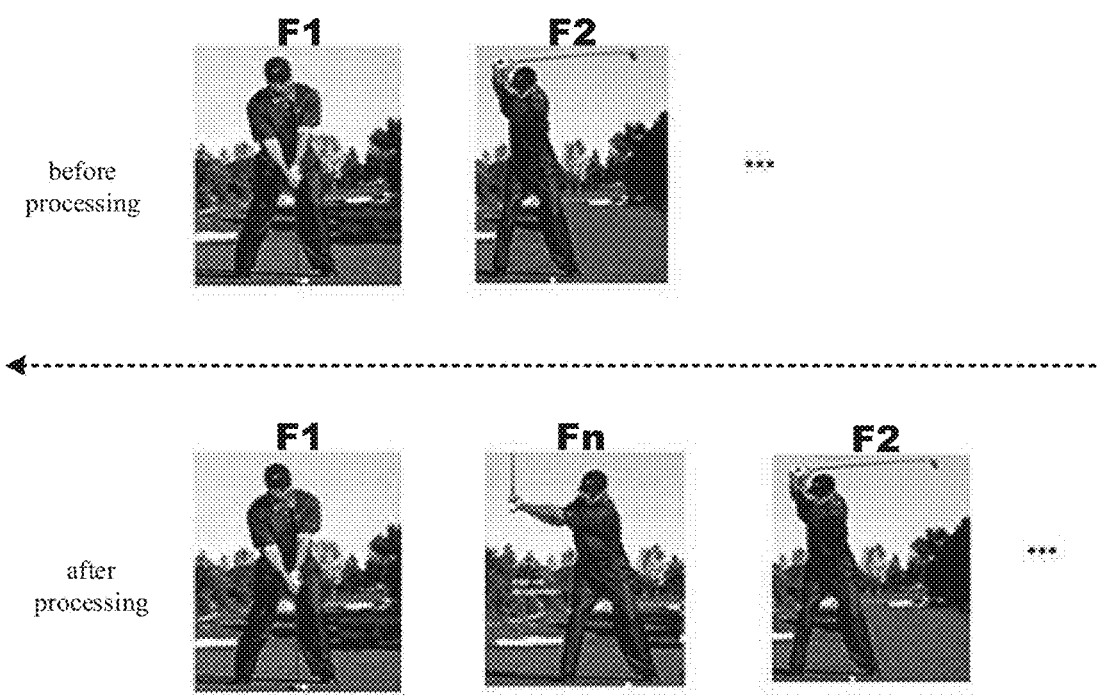
FIG. 7 is a schematic workflow diagram of a comparison before and after processing shown in FIG. 6.

FIG. 7 is a schematic workflow diagram of a comparison before and after processing shown in FIG. 6. Before the above-mentioned display process is processed, the display panel 300 only sequentially displays the picture to be displayed corresponding to the first frame data stream F1 and the picture to be displayed corresponding to the second frame data stream F2. After the above-mentioned display process, the display panel 300 can sequentially display the picture to be displayed corresponding to the first frame data stream F1, the picture to be displayed corresponding to the derived frame data stream Fn, and the picture to be displayed corresponding to the second frame data stream F2. It not only reduces the driving frequency of the application processor 100, but also reduces the transmission bandwidth between the application processor 100 and the display driving chip 200, and also increases the continuity of picture display.

It should be noted that the above-mentioned display panel 300 may be, but is not limited to, a liquid crystal display panel, and may also be a self-luminous display panel, and may specifically be a full high definition (FHD) display.

In an embodiment, the present embodiment provides an electronic equipment, which includes the display device in at least one of the above embodiments, wherein the application processor 100 communicates serially with the display driving chip 200.

Understandably, the electronic equipment provided by the embodiment not only reduces the numbers of display data frames that the application processor 100 needs to transmit to the display driving chip 200, but also improves the continuity of picture display of the display panel 300 with the lower bandwidth between the application processor 100 and the display driving chip 200 by generating at least one derived picture data frame between the two adjacent native picture data frames in the display driving chip 200.

In addition, compared with the prior art in which the refresh frequency of the display panel 300 and the driving frequency of the application processor 100 need to be same, the electronic equipment provided by the present embodiment can additionally generate the at least one derived picture data frame between the two adjacent native picture data frames, thereby reducing amount of video data transmission between the application processor 100 and the display driving chip 200. Therefore, the application processor 100 can ensure a normal requirement of the terminal display at a driving frequency lower than the refresh frequency of the display panel 300.

Furthermore, since configuration of the application processor 1100 in terms of the bandwidth and the driving frequency is reduced, this not only can reduce cost of the application processor 100, but also reduce the power consumption of the application processor 100, thereby reducing the cost and the power consumption of the display device and electronic equipment.

The above-mentioned display device, as a device for displaying video or still pictures, not only can be fixed terminals such as televisions, desktop computers, monitors, and billboards, but also mobile terminals such as mobile phones, tablet computers, mobile communication terminals, electronic notepads, e-books, multimedia players, navigators, laptops, and also wearable electronic devices such as smart watches, smart glasses, virtual reality devices, and augmented reality devices.

It can be understood that for those of ordinary skill in the art, equivalent replacements or changes can be made according to the technical solutions and inventive concepts of the present application, and all these changes or replacements should belong to the protection scope of the appended claims of the present application.

What is claimed is:

1. A display device, comprising:
    an application processor, the application processor used to output at least two display data frames;
    a display driving chip, an input end of the display driving chip connected to an output end of the application processor, for outputting at least two native picture data frames corresponding to the at least two display data frames and at least one derived picture data frame between two adjacent native picture data frames; and
    a display panel, connected to an output end of the display driving chip for displaying pictures according to each of the native picture data frames and each of the derived picture data frames;
    wherein the display driving chip comprises:
    a first memory, the first memory is connected to the application processor for storing an Nth display data frame of the at least two display data frames;
    a second memory, the second memory is connected to the application processor for storing an (N+1)th display data frame of the at least two display data frames;
    a comparator, the comparator is connected to the first memory and the second memory for comparing a picture difference degree between the Nth display data frame and the (N+1)th display data frame and outputting a comparison result of the picture difference degree and a preset threshold; and
    a display driver, an input end of the display driver is connected to an input end of the first memory, an input end of the second memory, and an output end of the comparator;
    wherein the comparator comprises:
    a first comparison unit, a first input end of the first comparison unit is connected to the first memory, and a second input end of the first comparison unit is connected to the second memory; and
    a second comparison unit, a first input end of the second comparison unit is connected to an output end of the first comparison unit, a second input end of the second comparison unit is connected to a reference end corresponding to the preset threshold, and an output end of the second comparison unit is connected to an input end of the display driver;
    wherein in response to the picture difference degree being greater than the preset threshold or the picture difference degree being equal to zero, the display driver sequentially outputs the Nth native picture data frame, the at least one derived picture data frame, and the (N+1)th native picture data frame; and a picture to be displayed corresponding to the at least one derived picture data frame is same as at least one of a picture to be displayed corresponding to the Nth native picture data frame and a picture to be displayed corresponding to the (N+1)th native picture data frame.

2. The display device as claimed in claim 1, wherein a first input end of the comparator is connected to an output end of the first memory, a second input end of the comparator is connected to an output end of the second memory, and an output end of the comparator is connected to an input end of the display driver.

3. The display device as claimed in claim 1, wherein in response to the picture difference degree being less than or equal to the preset threshold and the picture difference degree being greater than zero, the display driver sequentially outputs the Nth native picture data frame, the at least one derived picture data frame, and the (N+1)th native picture data frame; and a picture to be displayed corresponding to the at least one derived picture data frame is different from a picture to be displayed corresponding to the Nth native picture data frame and a picture to be displayed corresponding to the (N+1)th native picture data frame.

4. The display device as claimed in claim 1, wherein a picture to be displayed corresponding to a former part of a frame in the at least one derived picture data frame is same as the picture to be displayed corresponding to the Nth native picture data frame, and a picture to be displayed corresponding to a latter part of the frame in the at least one derived picture data frame is same as the picture to be displayed corresponding to the (N+1)th native picture data frame.

5. The display device as claimed in claim 1, wherein a range of the preset threshold is greater than zero and less than or equal to 40%.

6. The display device as claimed in claim 1, wherein the first comparison unit is configured to compare the Nth display data frame with the (N+1)th display data frame to obtain the picture difference degree; and the second comparison unit is configured to compare the picture difference degree with the preset threshold to obtain the comparison result.

7. The display device as claimed in claim 1, wherein a data transmission frame rate between the application processor and the display driving chip is set to K Hz, a refresh frequency of the display panel is J Hz, and a result of dividing J by K is L; and the at least one derived picture data frame is [L−1] derived picture data frames, wherein [L−1] is value after L−1 is rounded.

8. The display device as claimed in claim 7, wherein the data transmission frame rate is less than the refresh frequency.

9. An electronic equipment, comprising the display device as claimed in claim 1, wherein the application processor communicates serially with the display driving chip.

10. The electronic equipment as claimed in claim 9, wherein a first input end of the comparator is connected to an output end of the first memory, a second input end of the comparator is connected to an output end of the second memory, and an output end of the comparator is connected to an input end of the display driver.

11. The electronic equipment as claimed in claim 9, wherein in response to the picture difference degree being less than or equal to the preset threshold and the picture difference degree being greater than zero, the display driver sequentially outputs the Nth native picture data frame, the at least one derived picture data frame, and the (N+1)th native picture data frame, and a picture to be displayed corresponding to the at least one derived picture data frame is different from a picture to be displayed corresponding to the Nth native picture data frame and a picture to be displayed corresponding to the (N+1)th native picture data frame.

12. The electronic equipment as claimed in claim 9, wherein a picture to be displayed corresponding to a former part of a frame in the at least one derived picture data frame is same as the picture to be displayed corresponding to the Nth native picture data frame, and a picture to be displayed corresponding to a latter part of the frame in the at least one derived picture data frame is same as the picture to be displayed corresponding to the (N+1)th native picture data frame.

13. The electronic equipment as claimed in claim 9, wherein a range of the preset threshold is greater than zero and less than or equal to 40%.

14. The electronic equipment as claimed in claim 9, wherein the first comparison unit is configured to compare the Nth display data frame with the (N+1)th display data frame to obtain the picture difference degree; and the second comparison unit is configured to compare the picture difference degree with the preset threshold to obtain the comparison result.

15. The electronic equipment as claimed in claim 9, wherein a data transmission frame rate between the application processor and the display driving chip is set to K Hz, a refresh frequency of the display panel is J Hz, and a result of dividing J by K is L; the at least one derived picture data frame is [L−1] derived picture data frames, wherein [L−1] is value after L−1 is rounded.

16. The electronic equipment as claimed in claim 15, wherein the data transmission frame rate is less than the refresh frequency.

* * * * *